US011880098B2

(12) United States Patent
Washino et al.

(10) Patent No.: US 11,880,098 B2
(45) Date of Patent: Jan. 23, 2024

(54) SEMICONDUCTOR OPTICAL DEVICE

(71) Applicant: Lumentum Japan, Inc., Sagamihara (JP)

(72) Inventors: Ryu Washino, Kanagawa (JP); Yoshihiro Nakai, Kanagawa (JP); Yuma Endo, Sagamihara (JP); Saori Hizume, Kanagawa (JP)

(73) Assignee: Lumentum Japan, Inc., Kanagawa (JP)

( * ) Notice: Subject to any disclaimer, the term of this patent is extended or adjusted under 35 U.S.C. 154(b) by 15 days.

(21) Appl. No.: 17/809,716

(22) Filed: Jun. 29, 2022

(65) Prior Publication Data
US 2023/0280604 A1    Sep. 7, 2023

(30) Foreign Application Priority Data

Mar. 3, 2022 (JP) .................................. 2022-032774
May 11, 2022 (JP) .................................. 2022-077986

(51) Int. Cl.
*G02F 1/015*    (2006.01)
(52) U.S. Cl.
CPC .................................. *G02F 1/0155* (2021.01)
(58) Field of Classification Search
CPC ..................................................... G02F 1/0155
USPC ........................................................... 359/248
See application file for complete search history.

(56) References Cited

U.S. PATENT DOCUMENTS

2022/0051937 A1*    2/2022   Huang .............. H01L 29/66621

FOREIGN PATENT DOCUMENTS

JP          2010-271667 A       12/2010
JP          2011-151088 A       8/2011

* cited by examiner

*Primary Examiner* — William Choi
(74) *Attorney, Agent, or Firm* — Harrity & Harrity, LLP

(57) ABSTRACT

A semiconductor optical device includes: a buried layer having a side surface, an upper surface, and an intermediate region; an insulating film on the upper surface of the buried layer; and an electrode including a mesa electrode, a pad electrode, and a lead-out electrode. The upper surface of the buried layer has an outer edge including a first edge extending along the first direction and a second edge extending along a second direction. The intermediate region includes an upright surface that stands straight between the side surface and the first edge, and a slope surface that slopes more gently than the upright surface and extends downward from the second edge. The lead-out electrode includes a portion on the insulating film and connected to the pad electrode, another portion on the intermediate region and through the slope surface, and another portion connected to the mesa electrode.

17 Claims, 14 Drawing Sheets

SEMICONDUCTOR OPTICAL DEVICE

CROSS-REFERENCE TO RELATED APPLICATIONS

The present application claims priority to Japanese patent application 2022-032774 filed on Mar. 3, 2022 and to Japanese patent application 2022-077986 filed on May 11, 2022, the contents of each are hereby incorporated by reference into this application.

TECHNICAL FIELD

The present disclosure relates generally to a semiconductor optical device.

BACKGROUND

A semiconductor optical device with a buried hetero-structure (BH structure) can have a mesa-stripe structure, which includes a multiple quantum well layer, both sides of which are buried with a semiconductor layer (buried layer). An insulating film can be disposed on an upper surface of the buried layer, and an electrode disposed on the insulating film. The insulating film can have a through-hole, inside which there is a top surface of the mesa-stripe structure, and the electrode can be electrically connected to the mesa-stripe structure inside the through-hole.

A base surface under the electrode, specifically an upper surface of the insulating film and the upper surface of the buried layer, can have a height difference (e.g., a step). If the step is large, the electrode may break.

SUMMARY

Some implementations described herein are directed to preventing breakage of an electrode.

In some implementations, a semiconductor optical device includes: a mesa-stripe structure extending in a first direction; a buried layer configured to bury both sides of the mesa-stripe structure, the buried layer having a side surface opposed to the mesa-stripe structure, the buried layer having an upper surface, the buried layer having an intermediate region between the side surface and the upper surface; an insulating film on the upper surface of the buried layer and not on a top surface of the mesa-stripe structure; and an electrode including a mesa electrode on the top surface of the mesa-stripe structure, the electrode including a pad electrode on the insulating film, the electrode including a lead-out electrode between the mesa electrode and the pad electrode. The upper surface of the buried layer has an outer edge, the outer edge including a first edge extending along the first direction and a second edge extending along a second direction perpendicular to the first direction. The intermediate region of the buried layer includes an upright surface that stands straight between the side surface and the first edge, the intermediate region including a slope surface that slopes more gently than the upright surface and extends downward from the second edge. The lead-out electrode includes a portion on the insulating film and connected to the pad electrode, another portion on the intermediate region and through the slope surface, and another portion connected to the mesa electrode.

DETAILED DESCRIPTION

Figure 1:
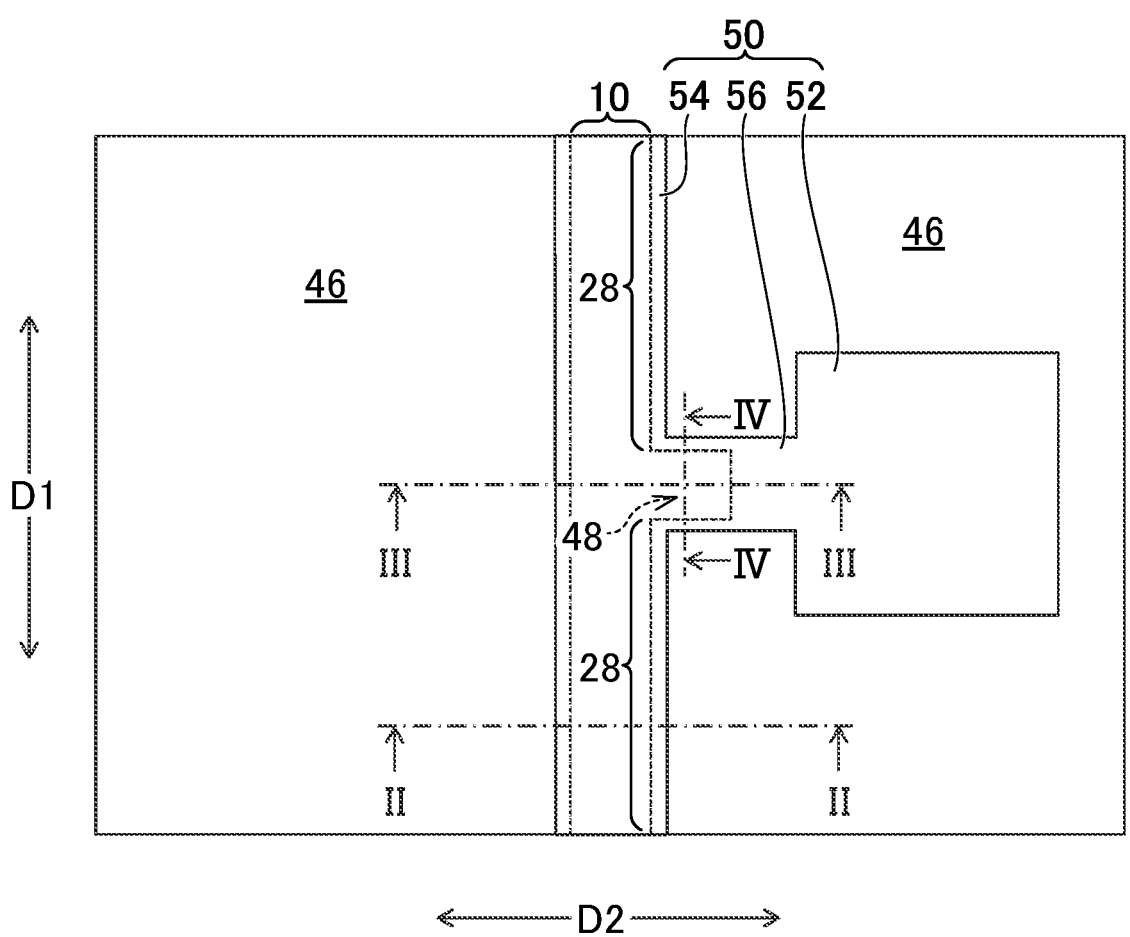
FIG. 1 is a plan view of a semiconductor optical device according to a first example implementation.

Some implementations are specifically described in detail in the following with reference to drawings. In the drawings, the same members are denoted by the same reference numerals and have the same or equivalent functions, and a repetitive description thereof may be omitted for the sake of simplicity. Note that, the drawings referred to in the following are only for illustrating the example implementations, and are not necessarily drawn to scale.

Figure 2:
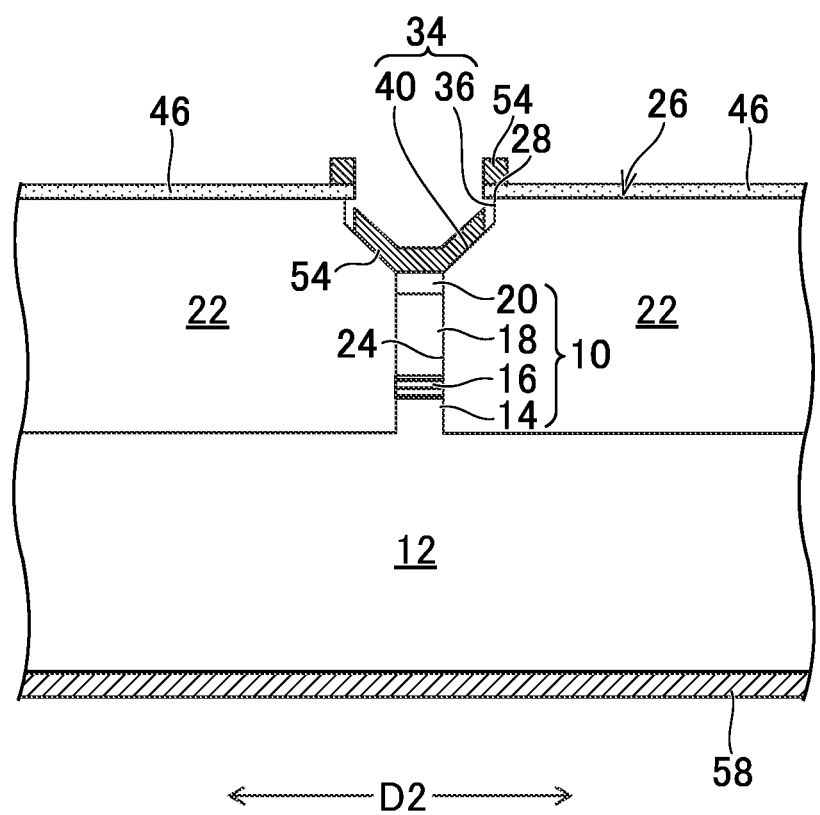
FIG. 2 is a II-II cross-sectional view of the semiconductor optical device in FIG. 1.

FIG. 1 is a plan view of a semiconductor optical device according to a first example implementation. FIG. 2 is a II-II cross-sectional view of the semiconductor optical device in FIG. 1. The semiconductor optical device may be either an electro-absorption modulator (EA modulator), a semiconductor laser, or a photodetector. A buried hetero-structure (BH structure) may be included in the semiconductor optical device. The BH structure may be a structure where both sides of a mesa-stripe structure are buried with a semiconductor layer such as a semi-insulating semiconductor layer or some p-n junction semiconductor layers, achieving not only a high reliability but also a high-speed response due to a low parasitic capacitance.

The semiconductor optical device may have a mesa-stripe structure 10 extending in a first direction D1. A semiconductor substrate 12 (e.g., n-InP substrate) may have a protrusion 14. The protrusion 14 constitutes a bottom of the mesa-stripe structure 10. The protrusion 14 (semiconductor substrate 12) serves as an n-type clad layer. Here, the n-type may be a first conductivity type.

The semiconductor optical device may have a multiple quantum well layer 16. The multiple quantum well layer 16 extends in one stripe in the first direction D1 on the protrusion 14. The semiconductor optical device may have a p-type clad layer 18. The p-type clad layer 18 (e.g., p-InP layer) extends in one stripe in the first direction D1 on the multiple quantum well layer 16. Here, the p-type may be a second conductivity type. Note that another layer such as an unillustrated optical confinement layer may be interposed between the multiple quantum well layer 16 and the protrusion 14 and between the multiple quantum well layer 16 and the p-type clad layer 18. In the example implementation, the first conductivity type may be the n-type and the second conductivity type may be the p-type, but this may be reversed.

The semiconductor optical device may have a p-type contact layer 20. The p-type contact layer 20 (e.g., p-InGaAs layer) extends in one stripe in the first direction D1 on the p-type clad layer 18. The p-type contact layer 20 may be an uppermost layer of the mesa-stripe structure 10.

The semiconductor optical device may have a buried layer 22 (e.g., semi-insulating Fe-InP layer). The buried layer 22 may be a single-crystal layer. The buried layer 22 may be provided (e.g., on the semiconductor substrate 12) except on the top surface of the mesa-stripe structure 10. The buried layer 22 may be in contact with side surfaces of the mesa-stripe structure 10 on both sides in a second direction D2 perpendicular to the first direction D1. The buried layer 22 may be taller than the mesa-stripe structure 10. The buried layer 22 may be configured to bury both sides of the mesa-stripe structure 10. The buried layer 22 may include a pair of buried layers 22 separated from each other. The buried layer 22 may have a side surface 24 opposed to the mesa-stripe structure 10. One of the pair of buried layers 22 may have the side surface 24.

Figure 3:
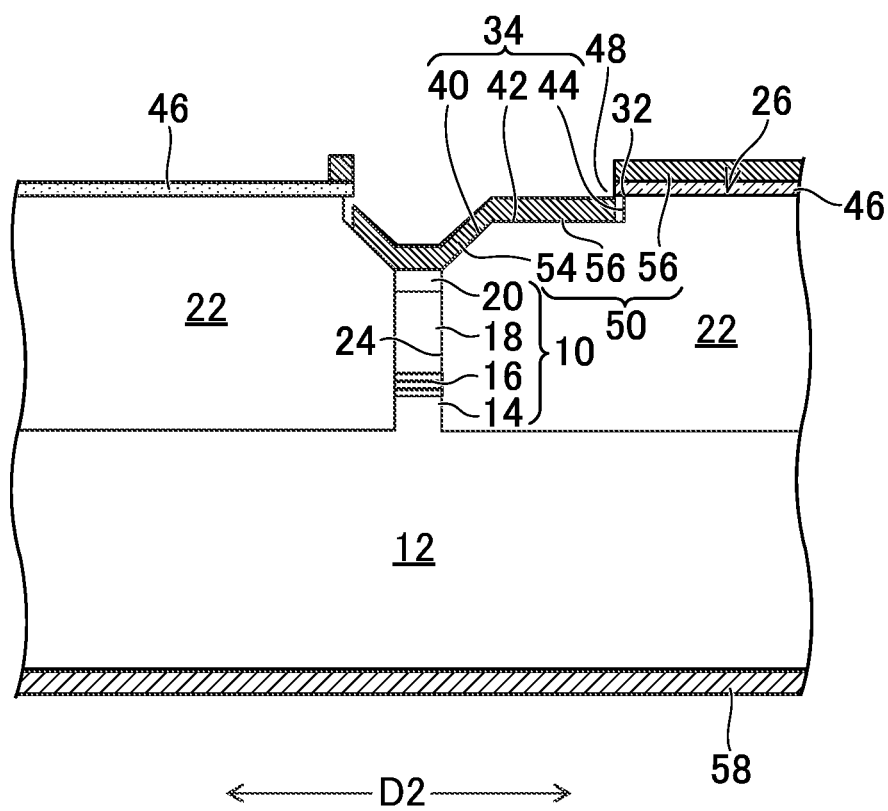
FIG. 3 is a cross-sectional view of the semiconductor optical device in FIG. 1.
Figure 4:
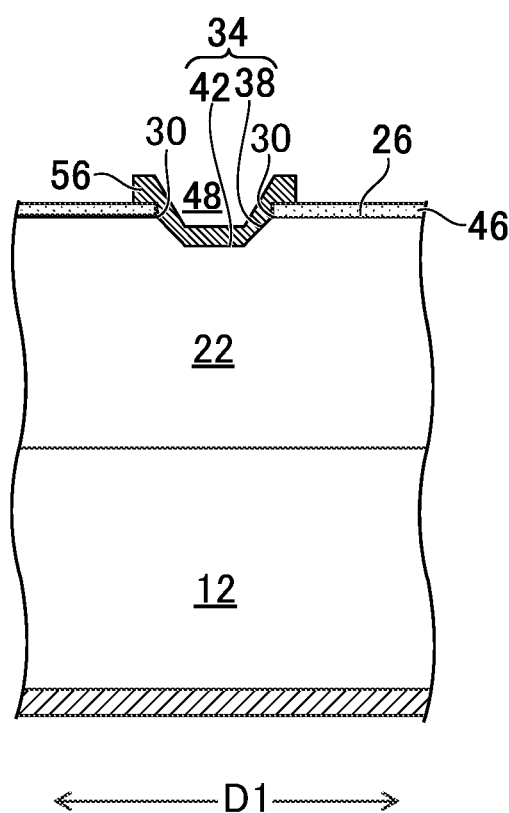
FIG. 4 is a IV-IV cross-sectional view of the semiconductor optical device in FIG. 1.

FIG. 3 is a cross-sectional view of the semiconductor optical device in FIG. 1. FIG. 4 is a IV-IV cross-sectional view of the semiconductor optical device in FIG. 1.

The buried layer 22 (one of the pair of buried layers 22) may have an upper surface 26. The outer edge of the upper surface 26 may include a first edge 28 (FIG. 2) extending along the first direction D1. The first edge 28 may include a pair of first edges 28 (FIG. 1) spaced apart and arranged in a straight line. The outer edge of the upper surface 26 may include a second edge 30 (FIG. 4) extending along the second direction D2 perpendicular to the first direction D1. The second edge 30 may include a pair of second edges 30 spaced apart and parallel to each other. The pair of first edges 28 may have respective tips opposed to each other and connected to respective tips of the pair of second edges 30. The outer edge of the upper surface 26 of the buried layer 22 further may include a third edge 32 (FIG. 3), between the pair of second edges 30, farther in the second direction D2 from the side surface 24 than the first edge 28, the third edge 32 extending along the first direction D1.

The buried layer 22 (one of the pair of buried layers 22) may have an intermediate region 34 between the side surface 24 and the upper surface 26. Part of the intermediate region 34 may be a recess surrounded with the pair of second edges 30 and the third edge 32. The intermediate region 34 may include an upright surface 36 (e.g., a vertical surface) that stands straight between the side surface 24 and the first edge 28 (FIG. 2). The upright surface 36 may be adjacent to the first edge 28. The upright surface 36 may be a crystal face. The intermediate region 34 may include a slope surface 38 (FIG. 4) that slopes more gently than the upright surface 36 and extends downward from the second edge 30. The slope surface 38 may be a crystal face. With the buried layer 22 comprising some layers, an area constituting the upper surface 26 and an upper surface of the intermediate region 34 may be single crystals. In other words, the buried layer 22 in contact with an insulating film 46 or an electrode 50, as described below, may be single crystals.

The intermediate region 34 may include another slope surface 40 (FIGS. 2 and 3), between the upright surface 36 and the side surface 24, that slopes downward more gently than the upright surface 36. The intermediate region 34 may include a flat surface 42 (FIG. 4) adjacent to a lower end of the slope surface 38 downward from the second edge 30, the flat surface 42 extending toward the side surface 24. The intermediate region 34 may include another upright surface 44 (FIG. 3) that stands straight next to the third edge 32.

The semiconductor optical device may have an insulating film 46. The insulating film 46 may not be on the top surface of mesa-stripe structure 10. The insulating film 46 may be on the upper surface 26 of the buried layer 22. The insulating film 46 may include a pair of insulating films 46 separated from each other. Each of the pair of insulating films 46 may be on a corresponding one of the pair of buried layers 22. The pair of insulating films 46 may be partially connected instead of being separated. For example, the pair of insulating films 46 may be connected at or near an edge of the mesa-stripe structure 10 in the first direction D1.

The insulating film 46 may have a cut-out section 48 (FIGS. 1 and 3), in a plan view, depressed in the second direction D2 along the second edge 30 from the mesa-stripe structure 10. The cut-out section 48 may have a width, in the first direction D1, that is uniform regardless of how far the cut-out section 48 is from the mesa-stripe structure 10.

The semiconductor optical device may have an electrode 50. The entire electrode 50 may comprise the same material and structure. The electrode 50 may include a pad electrode 52 on the insulating film 46. The entire pad electrode 52 may be on the insulating film 46. The insulating film 46 may be located between the buried layer 22 and the pad electrode 52. The buried layer 22 may be also located directly under the pad electrode 52. The pad electrode 52, in a planar shape, may be a quadrangle, a circle, a rounded square, or an oval.

The electrode 50 may include a mesa electrode 54 on the top surface of the mesa-stripe structure 10. The mesa electrode 54 extends to the intermediate region 34 and may be rectangular in shape. The mesa electrode 54 may be electrically and physically connected to the p-type contact layer 20. The mesa electrode 54 may be at the same potential as the p-type contact layer 20 and the p-type clad layer 18. Another layer may be interposed between them, as long as they are semiconductors of the same conductivity as the p-type contact layer 20 and the p-type clad layer 18.

The electrode 50 may include a lead-out electrode 56 between the mesa electrode 54 and the pad electrode 52. The lead-out electrode 56 may be connected to each of the mesa electrode 54 and the pad electrode 52. The lead-out electrode 56 may be narrower in the first direction D1 than any of the mesa electrode 54 and the pad electrode 52. The lead-out electrode 56 extends from the mesa electrode 54 in the second direction D2. The insulating film 46 may be also disposed under part of the lead-out electrode 56. The buried layer 22 may be also located directly under the lead-out electrode 56.

The lead-out electrode 56 may be inside and outside the cut-out section 48 of the insulating film 46. The cut-out section 48 may have a length, in the second direction D2, less than or equal to half of the lead-out electrode 56. Being less than or equal to one-fourth may be preferable. The lead-out electrode 56 may include a portion on the insulating film 46 and connected to the pad electrode 52. The lead-out electrode 56 may include a portion on the intermediate region 34 and through the slope surface 38, and may include another portion connected to the mesa electrode 54, while these portions may be continuous (electrically continuous).

The semiconductor optical device may have a counter electrode 58. The counter electrode 58 may be located on a surface (back surface) of the semiconductor substrate 12, opposite to the protrusion 14. The counter electrode 58 may almost entirely cover the back surface of the semiconductor substrate 12. The counter electrode 58 may be at the same potential as the semiconductor substrate 12, and another layer may be interposed between them, as long as the other layer a semiconductor of the same conductivity type as the semiconductor substrate 12. If the semiconductor optical device is an EA modulator, by applying a reverse bias between the mesa electrode 54 and the counter electrode 58, the multiple quantum well layer 16 absorbs light.

Figure 5:
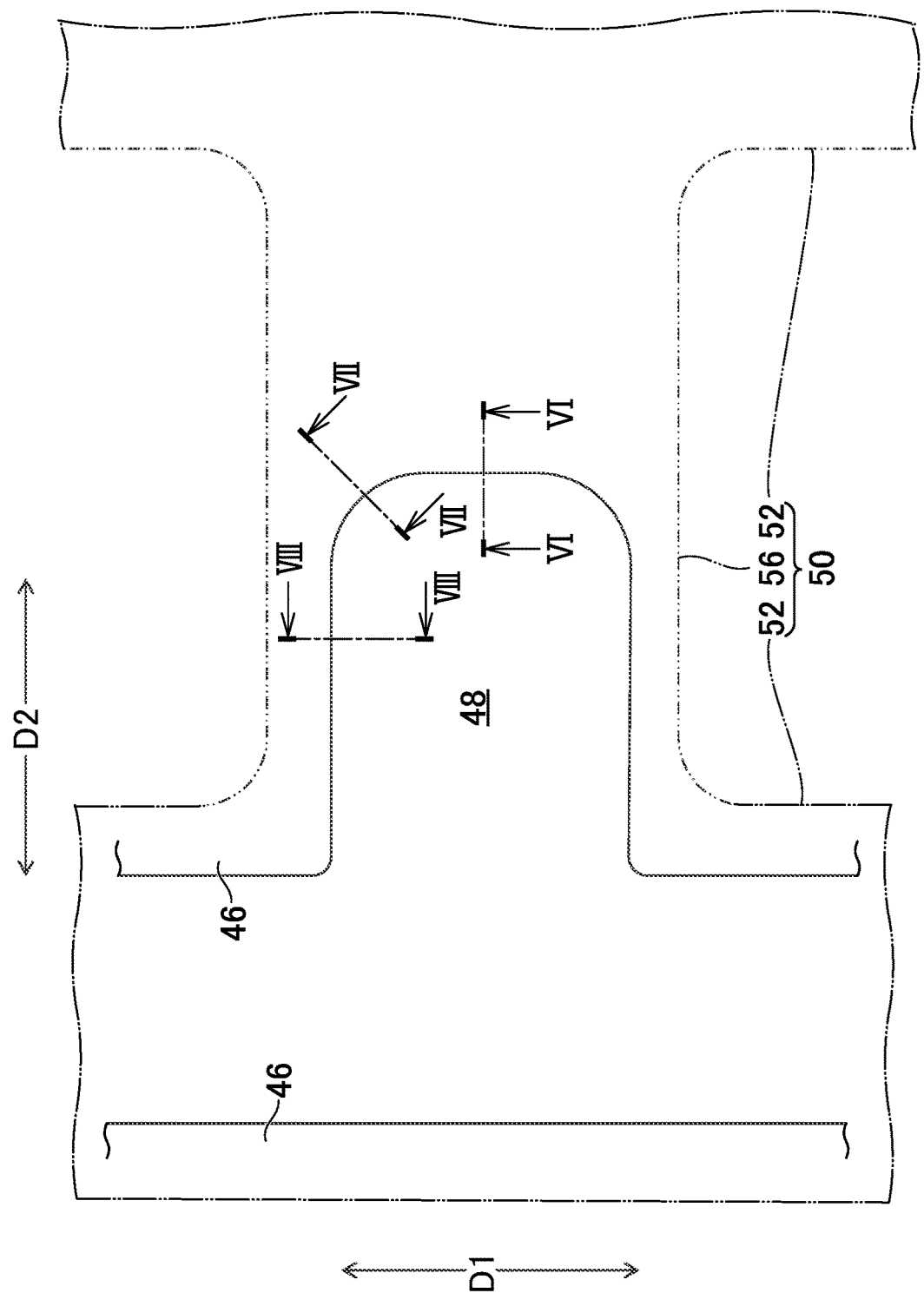
FIG. 5 is an enlarged plan view of an area, including a cut-out section of an insulating film, of the semiconductor optical device in FIG. 1.
Figure 6:
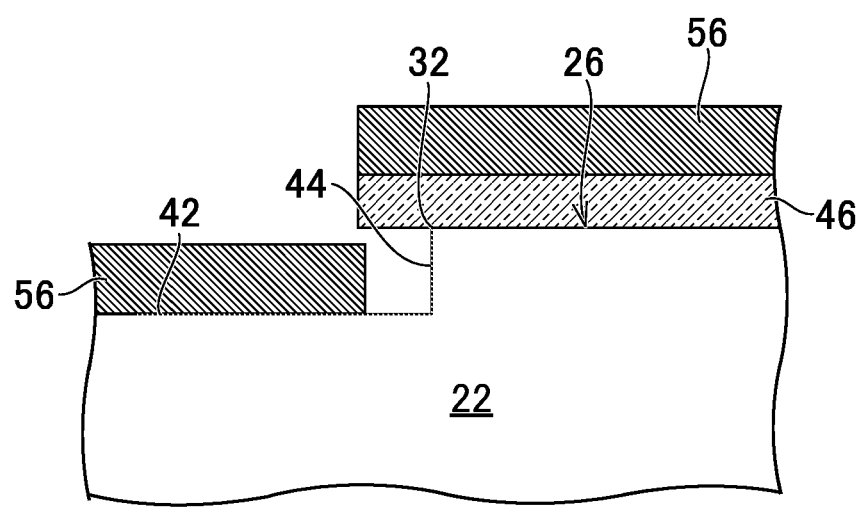
FIG. 6 is a VI-VI cross-sectional view of the semiconductor optical device in FIG. 5.
Figure 7:
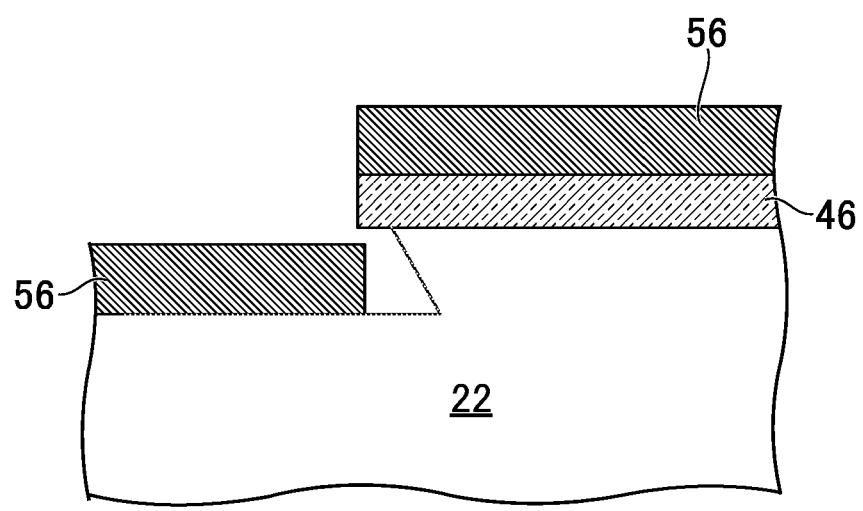
FIG. 7 is a VII-VII cross-sectional view of the semiconductor optical device in FIG. 5.
Figure 8:
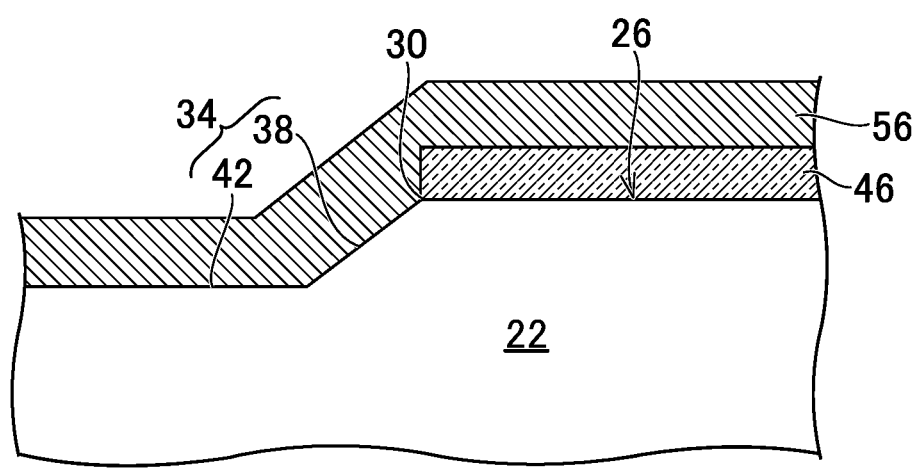
FIG. 8 is a VIII-VIII cross-sectional view of the semiconductor optical device in FIG. 5.

FIG. 5 is an enlarged plan view of an area, including a cut-out section 48 of an insulating film 46, of the semiconductor optical device in FIG. 1. FIG. 6 is a VI-VI cross-sectional view of the semiconductor optical device in FIG. 5. FIG. 7 is a VII-VII cross-sectional view of the semiconductor optical device in FIG. 5. FIG. 8 is a VIII-VIII cross-sectional view of the semiconductor optical device in FIG. 5.

The cut-out section 48 of the insulating film 46 may be formed by partially masking and partially removing the insulating film 46. The removal may be done by etching. Even when the mask is polygonal in shape, the insulating film 46 may be etched to have a rounded corner shape regardless of its sharp corners. Alternatively, a mask in a rounded corner shape may be used. The cut-out section 48 may be modified to include a through-hole. The through-hole may be an opening formed in the insulating film 46 to physically connect the electrode 50 to the mesa-stripe structure 10. The through-hole may include a mesa opening surrounding the top surface of the mesa-stripe structure 10 and an upper side of the slope surface 40 of the buried layer 22, and the mesa opening may be rectangular in shape. The through-hole may include an extraction opening extending in the second direction D2 from the mesa opening. The extraction opening may have a narrower width in the first direction D1 than the mesa opening. The extraction opening does not extend to the pad electrode 52. The mesa electrode 54 may be larger in both the first direction D1 and the second direction D2 than the mesa opening. Therefore, part of the mesa electrode 54 may be also located on the insulating film 46. The lead-out electrode 56 may be larger in both the first direction D1 and the second direction D2 than the extraction opening. Therefore, part of the lead-out electrode 56 may be also located on the insulating film 46.

In processes from partial removal of insulating film 46 to formation of electrode 50, the buried layer 22 under the insulating film 46 can also be etched. As a result, there may be a height difference (e.g., a step) between the surface of the insulating film 46 and the surface of the buried layer 22. Moreover, the etching of the buried layer 22 may be subject to a side-etching phenomenon (FIGS. 2 and 6) under the tip of the insulating film 46 along the first direction D1. Therefore, the tip of the insulating film 46 may overhang from the first edge 28 (FIG. 2) and the third edge 32 (FIG. 6). The lead-out electrode 56 may be formed on the buried layer 22 in this shape and the insulating film 46, whereby the lead-out electrode 56, which may be formed to be continuous, becomes discontinuous (broken). The lead-out electrode 56 may be often formed by vapor deposition.

As shown in FIG. 7, the buried layer 22 may be subject to the side-etching phenomenon also under a portion, of the tip of the insulating film 46, that extends in a direction intersecting both the first direction D1 and the second direction D2. Moreover, the etched surface may be an overhanging surface that slopes upward and outward due to the crystal face. Therefore, here, too, the lead-out electrode 56, which may be formed to be continuous from above the insulating film 46 to the mesa electrode 54, becomes discontinuous (broken).

By contrast, as shown in FIG. 8, the tip of the insulating film 46 along the second direction D2 does not protrude from the upper surface 26 of the buried layer 22. This is because the buried layer 22 may have the slope surface 38 due to the crystal face. The intermediate region 34 of the buried layer 22 may include the slope surface 38 that slopes more gently than the upright surface 36 and extends downward from the second edge 30. Therefore, there may be a small height difference (step) between the surface of the insulating film 46 and the surface (slope surface 38) of the buried layer 22. As a result, the lead-out electrode 56 extends smoothly and continuously through the slope surface 38. Then, an electrical connection may be secured between the pad electrode 52 and the mesa electrode 54.

Figure 9:
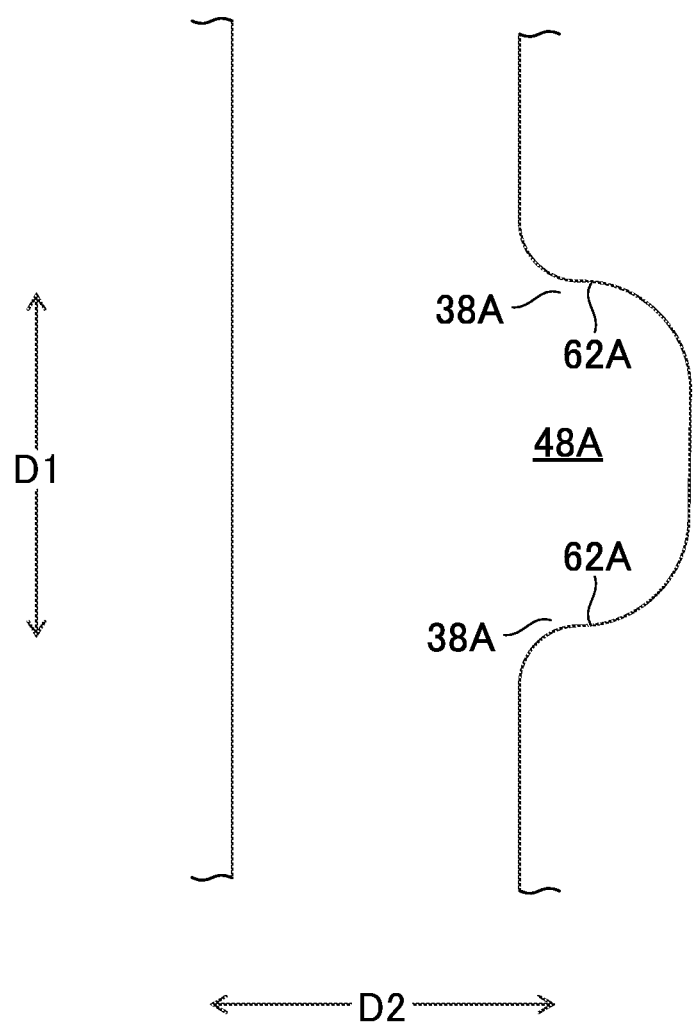
FIG. 9 is a plan view of a cut-out section of an insulating film according to variant 1.

FIG. 9 is a plan view of a cut-out section of an insulating film according to variant 1. The cut-out section 48A in FIG. 9 may be shorter in the second direction D2 than the cut-out section 48 in FIG. 5. Therefore, a straight edge 62A along the second direction D2 may be shortened, and the slope surface 38A of the buried layer may be narrowed, accordingly. However, if the slope surface 38A is wide enough, the lead-out electrode may be continuous, and thus an electrical connection may be secured between the pad electrode and the mesa electrode. The cut-out section 48A (straight edge 62A along the second direction D2) may have a length of 3 μm or more in the second direction D2.

Figure 10:
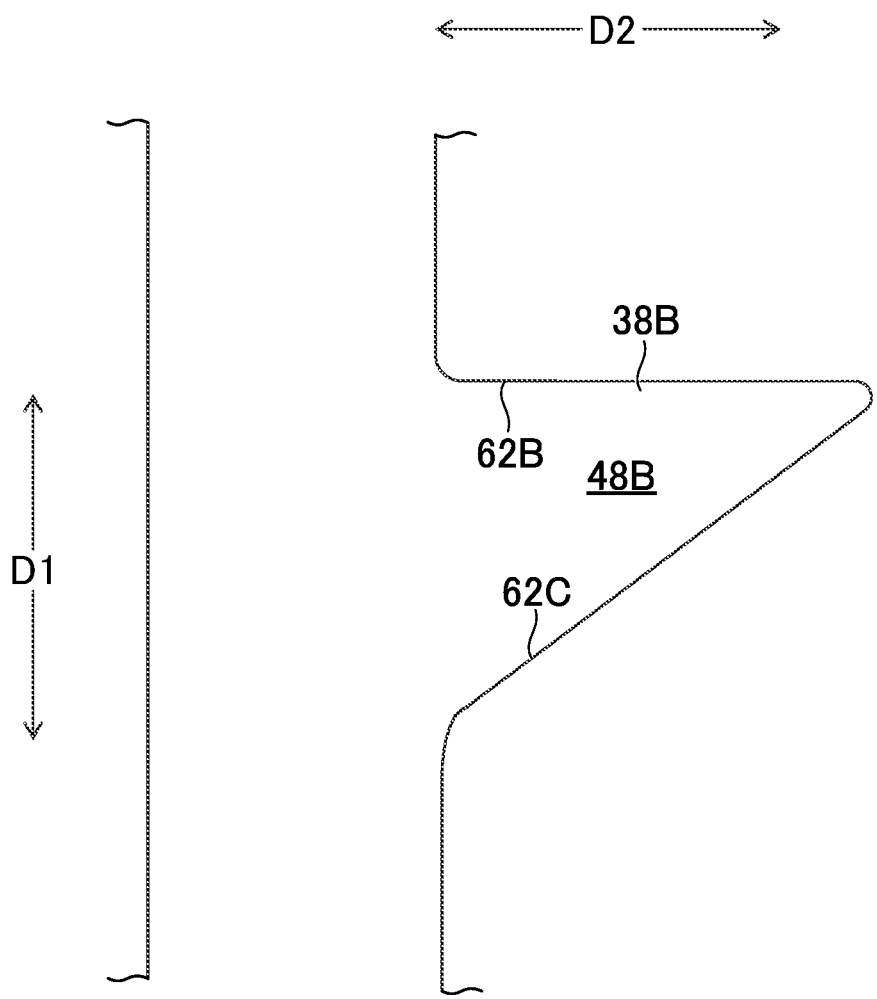
FIG. 10 is a plan view of cut-out section of an insulating film according to variant 2.

FIG. 10 is a plan view of cut-out section of an insulating film according to variant 2. The cut-out section 48B may have a width, in the first direction D1, smaller at a portion farther from the mesa-stripe structure. The cut-out section 48B may include a straight edge 62B along the second direction D2 and a diagonal edge 62C intersecting both the first direction D1 and the second direction D2. The buried layer may have the slope surface 38B adjacent to the straight edge 62B but does not always have a slope surface adjacent to the diagonal edge 62C. Therefore, continuity of the lead-out electrode may be ensured at a portion through the straight edge 62B. In FIG. 10, the straight edge 62B is on the upper side and the diagonal edge 62C is on the lower side, but this may be reversed.

Figure 11:
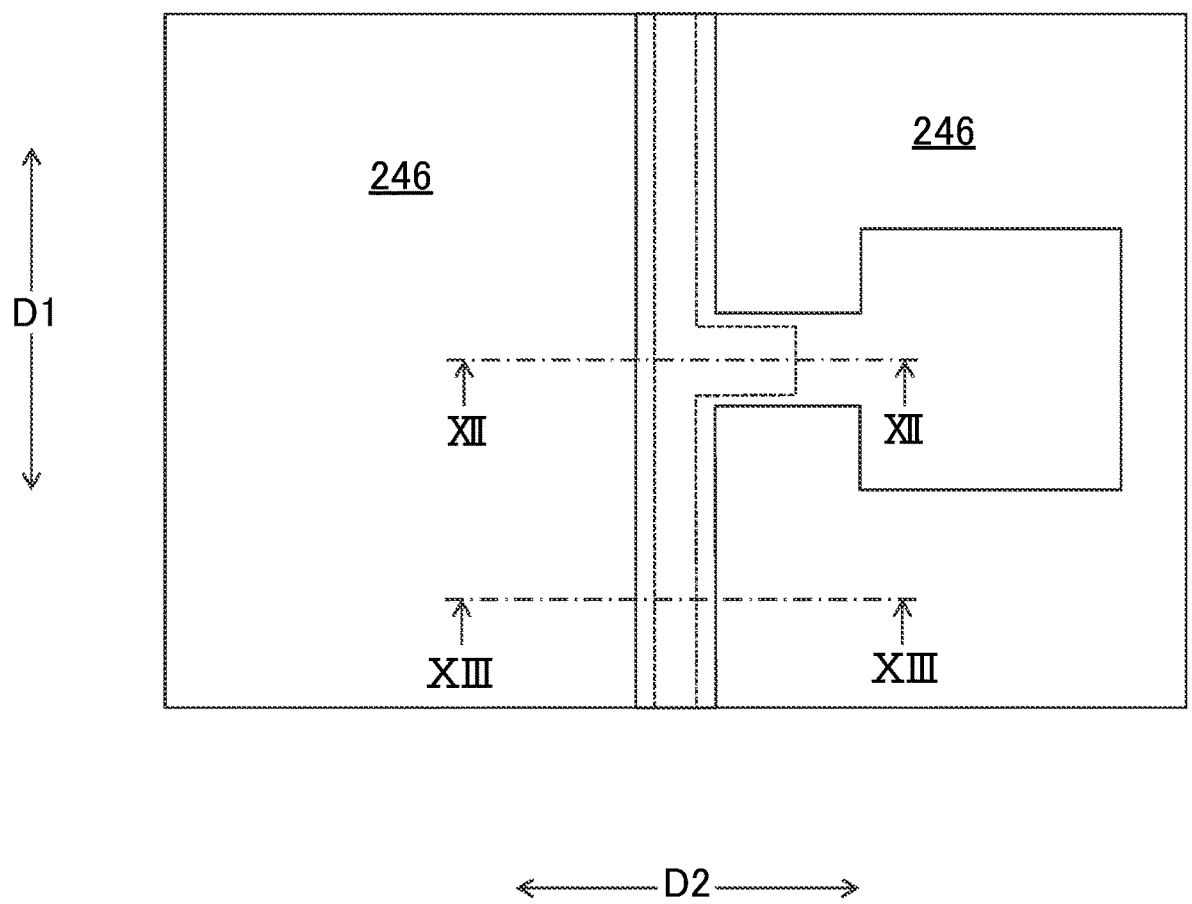
FIG. 11 is a plan view of a semiconductor optical device according to a second example implementation.
Figure 12:
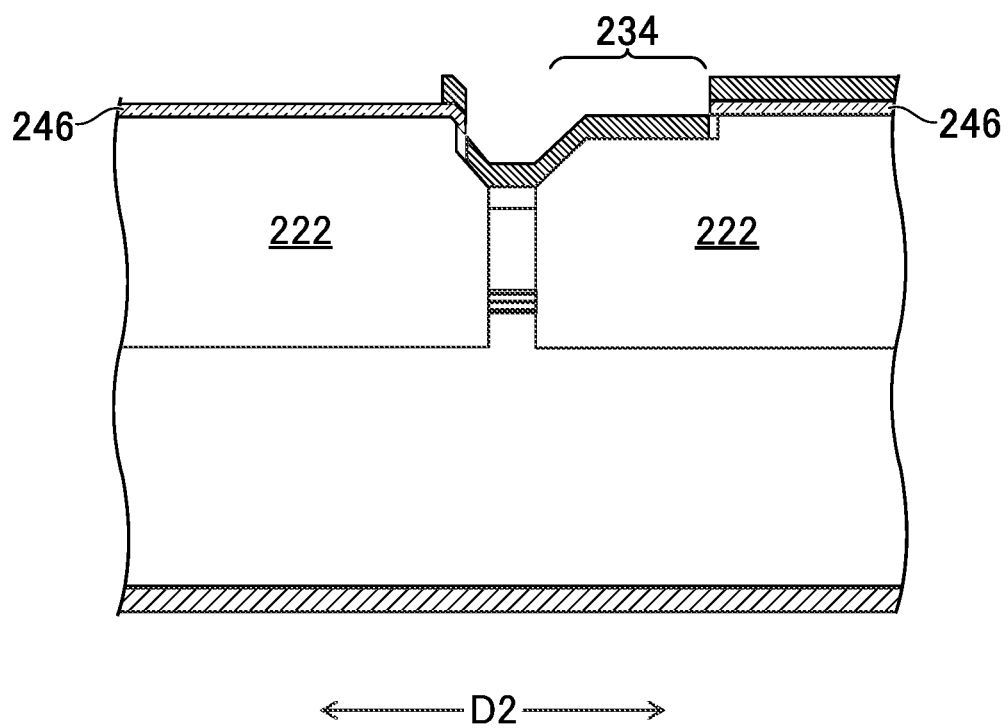
FIG. 12 is a XII-XII cross-sectional view of the semiconductor optical device in FIG. 11.
Figure 13:
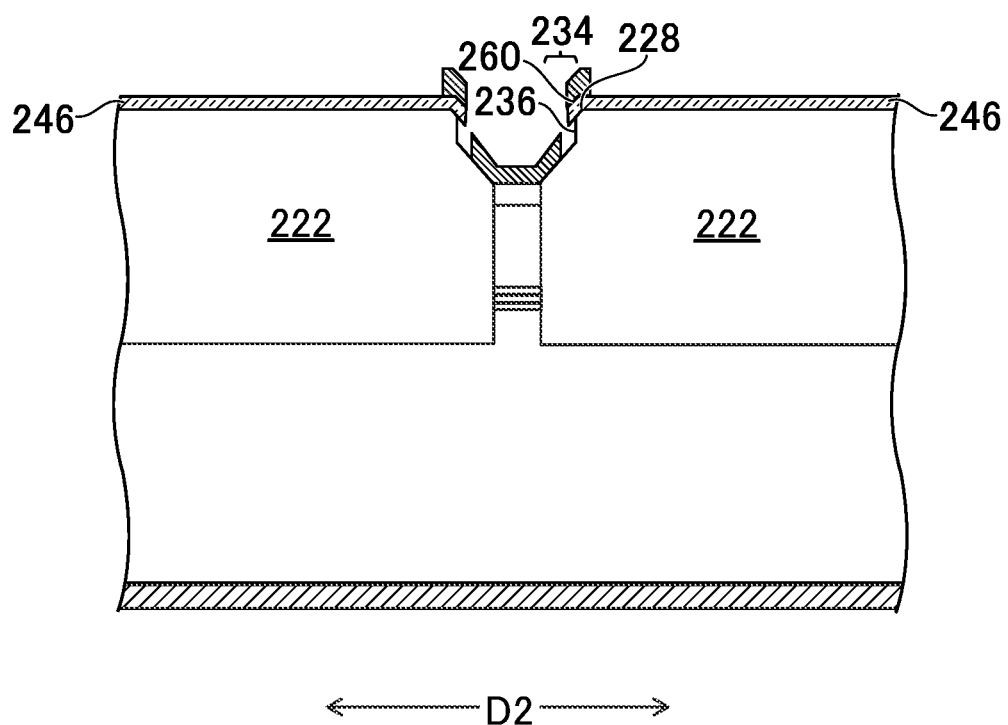
FIG. 13 is a XIII-XIII cross-sectional view of the semiconductor optical device in FIG. 11.

FIG. 11 is a plan view of a semiconductor optical device according to a second example implementation. FIG. 12 is a XII-XII cross-sectional view of the semiconductor optical device in FIG. 11. FIG. 13 a XIII-XIII cross-sectional view of the semiconductor optical device in FIG. 11.

The intermediate region 234 of the buried layer 222 may include another slope surface 260, between the first edge 228 and the upright surface 236, that slopes downward more gently than the upright surface 236. The slope surface 260 may be also be formed depending on the crystal orientation. The insulating film 246 may be also disposed on the slope surface 260 and protrudes from the slope surface 260. The insulating film 246 also protrudes from the upright surface 236 of the buried layer 222. Other aspects described in the first example implementation may be applicable here.

Figure 14:
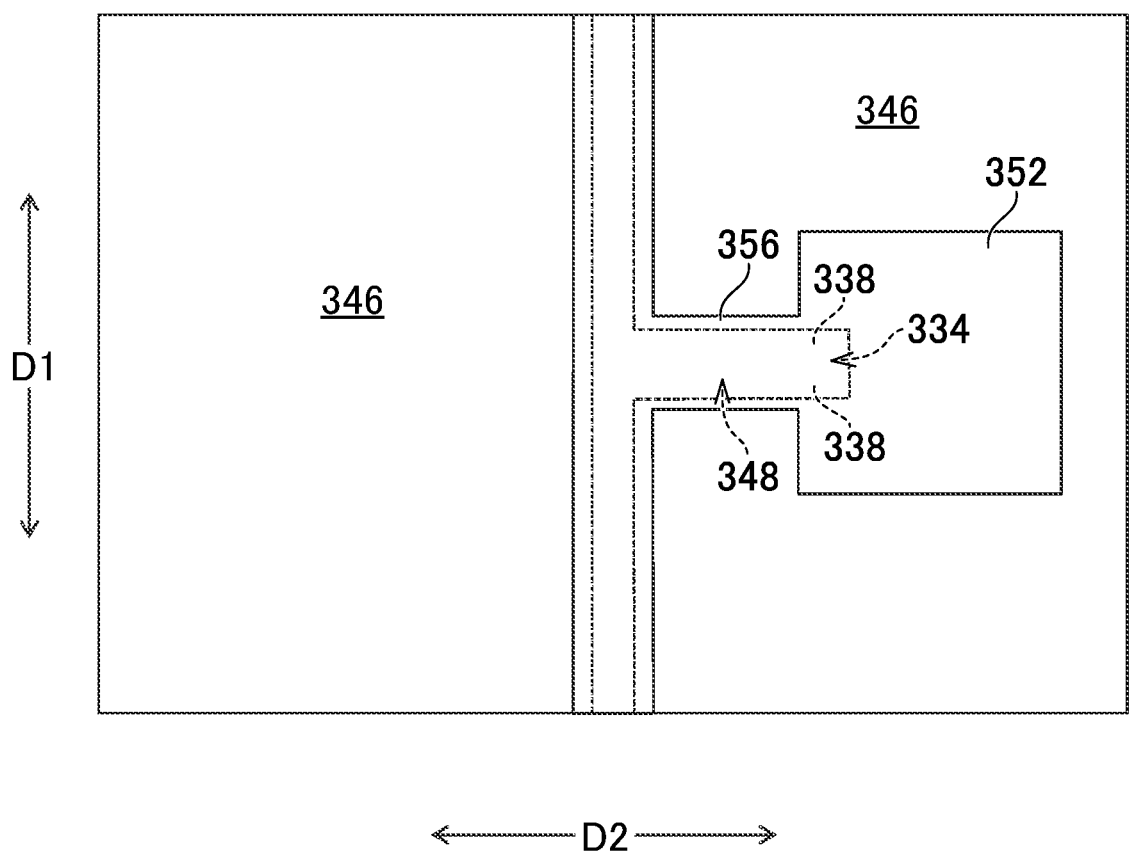
FIG. 14 is a plan view of a semiconductor optical device according to a third example implementation.

FIG. 14 is a plan view of a semiconductor optical device according to a third example implementation. Part of the pad electrode 352 may be on the intermediate region 334 without overlapping with the insulating film 346. In other words, the cut-out section 348 may be longer in the second direction D2 and overlaps with the pad electrode 352. As a result, the slope surface 338 may be wider, leading to superiority in terms of reducing probability of disconnection and lowering resistance of the lead-out electrode 356. Other aspects described in the first example implementation may be applicable here.

With the cut-out section 348 extending under the pad electrode 352, the pad electrode 352 may have an uneven surface. The unevenness of the pad electrode 352 may affect bonding strength of a wire bonded to the pad electrode 352. Therefore, depending on the pad electrode 352 and thickness of the bonding wire, the cut-out section 348 should not extend to the pad electrode 352. The lead-out electrode 356 may have a parasitic capacitance component. To reduce the parasitic capacitance component, it may be effective to increase the distance between the lead-out electrode 356 and the semiconductor substrate. If the insulating film 346 is not placed under the lead-out electrode 356, the parasitic capacitance increases compared to the case where it is placed. Therefore, enlarging the cut-out section 348 leads to increase in parasitic capacitance. From this point of view, the cut-out section 348 should have a length, in the second direction D2, less than or equal to half, preferably one-fourth, of the lead-out electrode 356.

In a first implementation, a semiconductor optical device includes: a mesa-stripe structure 10 extending in a first direction D1; a buried layer 22 configured to bury both sides of the mesa-stripe structure 10, the buried layer 22 having a side surface 24 opposed to the mesa-stripe structure 10, the buried layer 22 having an upper surface 26, the buried layer 22 having an intermediate region 34 between the side surface 24 and the upper surface 26; an insulating film 46 on the upper surface 26 of the buried layer 22 and not on a top surface of the mesa-stripe structure 10; and an electrode 50 including a mesa electrode 54 on the top surface of the mesa-stripe structure 10, the electrode 50 including a pad electrode 52 on the insulating film 46, the electrode 50 including a lead-out electrode 56 between the mesa electrode 54 and the pad electrode 52, the upper surface 26 of the buried layer 22 having an outer edge, the outer edge including a first edge 28 extending along the first direction D1 and a second edge 30 extending along a second direction D2 perpendicular to the first direction D1, the intermediate region 34 of the buried layer 22 including an upright surface 36 that stands straight between the side surface 24 and the first edge 28, the intermediate region 34 including a slope surface 38 that slopes more gently than the upright surface 36 and extends downward from the second edge 30, the lead-out electrode 56 including a portion on the insulating film 46 and connected to the pad electrode 52, another portion on the intermediate region 34 and through the slope surface 38, and another portion connected to the mesa electrode 54.

The intermediate region 34 of the buried layer 22 includes the upright surface 36 that stands straight between the side surface 24 and the first edge 28, resulting in easy breakage of the lead-out electrode 56. Further, the intermediate region 34 of the buried layer 22 includes the slope surface 38 that slopes more gently than the upright surface 36 and extends downward from the second edge 30, while part of the lead-out electrode 56 runs through the slope surface 38. Therefore, electrical connection of the lead-out electrode 56 can be secured between the pad electrode 52 and the mesa electrode 54.

In a second implementation, alone or in combination with the first implementation, the buried layer 22 is a single-crystal layer, and the upright surface 36 and the slope surface 38 are crystal faces.

In a third implementation, alone or in combination with one or more of the first and second implementations, the upright surface 36 is adjacent to the first edge 28.

In a fourth implementation, alone or in combination with one or more of the first through third implementations, the intermediate region 34 of the buried layer 22 further includes another slope surface 40, between the upright surface 36 and the side surface 24, that slopes downward more gently than the upright surface 36.

In a fifth implementation, alone or in combination with one or more of the first through fourth implementations, the intermediate region 234 of the buried layer 222 further includes another slope surface 260, between the first edge 228 and the upright surface 236, that slopes downward more gently than the upright surface 236.

In a sixth implementation, alone or in combination with one or more of the first through fifth implementations, the intermediate region 34 of the buried layer 22 further includes a flat surface 42 adjacent to a lower end of the slope surface 38 downward from the second edge 30, the flat surface 42 extending toward the side surface 24.

In a seventh implementation, alone or in combination with one or more of the first through sixth implementations, the first edge 28 includes a pair of first edges 28 spaced apart and arranged in a straight line, the second edge 30 includes a pair of second edges 30 spaced apart and parallel to each other, the pair of first edges 28 have respective tips opposed to each other and connected to respective tips of the pair of second edges 30, the outer edge of the upper surface 26 of the buried layer 22 further includes a third edge 32, between the pair of second edges 30, farther in the second direction D2 from the side surface 24 than the first edge 28, the third edge 32 extending along the first direction D1, and part of the intermediate region 34 is a recess surrounded with the pair of second edges 30 and the third edge 32.

In an eighth implementation, alone or in combination with one or more of the first through seventh implementations, the intermediate region 34 of the buried layer 22 further includes another upright surface 44 that stands straight next to the third edge 32.

In a ninth implementation, alone or in combination with one or more of the first through eighth implementations, the entire pad electrode 52 is on the insulating film 46.

In a tenth implementation, alone or in combination with one or more of the first through ninth implementations, part of the pad electrode 352 is on the intermediate region 334 without overlapping with the insulating film 346.

In an eleventh implementation, alone or in combination with one or more of the first through tenth implementations, the mesa electrode 54 extends to the intermediate region 34.

In an twelfth implementation, alone or in combination with one or more of the first through eleventh implementations, the insulating film 46 has a cut-out section 48, in a plan view, depressed in the second direction D2 along the second edge 30 from the mesa-stripe structure 10, and the lead-out electrode 56 is inside and outside the cut-out section 48.

In a thirteenth implementation, alone or in combination with one or more of the first through twelfth implementations, the cut-out section 48 has a length, in the second direction D2, less than or equal to half of the lead-out electrode 56.

In a fourteenth implementation, alone or in combination with one or more of the first through thirteenth implementations, the cut-out section 48B has a width, in the first direction D1, smaller at a portion farther from the mesa-stripe structure 10.

In a fifteenth implementation, alone or in combination with one or more of the first through fourteenth implementations, the cut-out section 48 has a width, in the first direction D1, uniform irrespective of how far from the mesa-stripe structure 10.

In a sixteenth implementation, alone or in combination with one or more of the first through fifteenth implementations, the buried layer 22 includes a pair of buried layers 22 separated from each other, and one of the pair of buried layers 22 has the side surface 24, the upper surface 26, and the intermediate region 34.

In a seventeenth implementation, alone or in combination with one or more of the first through sixteenth implementations, the insulating film 46 includes a pair of insulating films 46 separated from each other, and each of the pair of insulating films 46 is on a corresponding one of the pair of buried layers 22.

The example implementations described above are not limited and different variations are possible. The structures explained in the example implementations may be replaced with substantially the same structures and other structures that can achieve the same effect or the same objective.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A semiconductor optical device comprising:
   a mesa-stripe structure extending in a first direction;
   a buried layer configured to bury both sides of the mesa-stripe structure, the buried layer having a side surface opposed to the mesa-stripe structure, the buried layer having an upper surface, the buried layer having an intermediate region between the side surface and the upper surface;
   an insulating film on the upper surface of the buried layer and not on a top surface of the mesa-stripe structure; and
   an electrode including a mesa electrode on the top surface of the mesa-stripe structure, the electrode including a pad electrode on the insulating film, the electrode including a lead-out electrode between the mesa electrode and the pad electrode,
   the upper surface of the buried layer having an outer edge, the outer edge including a first edge extending along the first direction and a second edge extending along a second direction perpendicular to the first direction,
   the intermediate region of the buried layer including an upright surface that stands straight between the side surface and the first edge, the intermediate region including a slope surface that slopes more gently than the upright surface and extends downward from the second edge,
   the lead-out electrode including a portion on the insulating film and connected to the pad electrode, another portion on the intermediate region and through the slope surface, and another portion connected to the mesa electrode.

2. The semiconductor optical device according to claim 1, wherein
   the buried layer is a single-crystal layer, and
   the upright surface and the slope surface are crystal faces.

3. The semiconductor optical device according to claim 1, wherein the upright surface is adjacent to the first edge.

4. The semiconductor optical device according to claim 1, wherein the intermediate region of the buried layer further includes another slope surface, between the upright surface and the side surface, that slopes downward more gently than the upright surface.

5. The semiconductor optical device according to claim 1, wherein the intermediate region of the buried layer further includes another slope surface, between the first edge and the upright surface, that slopes downward more gently than the upright surface.

6. The semiconductor optical device according to claim 1, wherein the intermediate region of the buried layer further includes a flat surface adjacent to a lower end of the slope surface downward from the second edge, the flat surface extending toward the side surface.

7. The semiconductor optical device according to claim 1, wherein the first edge includes a pair of first edges spaced apart and arranged in a straight line, the second edge includes a pair of second edges spaced apart and parallel to each other, the pair of first edges have respective tips opposed to each other and connected to respective tips of the pair of second edges, the outer edge of the upper surface of the buried layer further includes a third edge, between the pair of second edges, farther in the second direction from the side surface than the first edge, the third edge extending along the first direction, and part of the intermediate region is a recess surrounded with the pair of second edges and the third edge.

8. The semiconductor optical device according to claim 7, wherein the intermediate region of the buried layer further includes another upright surface that stands straight next to the third edge.

9. The semiconductor optical device according to claim 1, wherein the entire pad electrode is on the insulating film.

10. The semiconductor optical device according to claim 1, wherein part of the pad electrode is on the intermediate region without overlapping with the insulating film.

11. The semiconductor optical device according to claim 1, wherein the mesa electrode extends to the intermediate region.

12. The semiconductor optical device according to claim 1, wherein the insulating film has a cut-out section, in a plan view, depressed in the second direction along the second edge from the mesa-stripe structure, and the lead-out electrode is inside and outside the cut-out section.

13. The semiconductor optical device according to claim 12, wherein the cut-out section has a length, in the second direction, less than or equal to half of the lead-out electrode.

14. The semiconductor optical device according to claim 12, wherein the cut-out section has a width, in the first direction, smaller at a portion farther from the mesa-stripe structure.

15. The semiconductor optical device according to claim 12, wherein the cut-out section has a width, in the first direction, uniform irrespective of how far from the mesa-stripe structure.

16. The semiconductor optical device according to claim 1, wherein the buried layer includes a pair of buried layers separated from each other, and one of the pair of buried layers has the side surface, the upper surface, and the intermediate region.

17. The semiconductor optical device according to claim 16, wherein the insulating film includes a pair of insulating films separated from each other, and each of the pair of insulating films is on a corresponding one of the pair of buried layers.

* * * * *